US012265212B2

(12) United States Patent
Xu et al.

(10) Patent No.: US 12,265,212 B2
(45) Date of Patent: *Apr. 1, 2025

(54) 3D MICROSCOPE INCLUDING INSERTABLE COMPONENTS TO PROVIDE MULTIPLE IMAGING AND MEASUREMENT CAPABILITIES

(71) Applicant: KLA-Tencor Corporation, Milpitas, CA (US)

(72) Inventors: James Jianguo Xu, San Jose, CA (US); Ken Kinsun Lee, Los Altos Hills, CA (US); Rusmin Kudinar, Fremont, CA (US); Ronny Soetarman, Fremont, CA (US); Hung Phi Nguyen, Santa Clara, CA (US); Zhen Hou, Fremont, CA (US)

(73) Assignee: KLA-Tencor Corporation, Milpitas, CA (US)

( * ) Notice: Subject to any disclaimer, the term of this patent is extended or adjusted under 35 U.S.C. 154(b) by 53 days.

This patent is subject to a terminal disclaimer.

(21) Appl. No.: 18/070,389

(22) Filed: Nov. 28, 2022

(65) Prior Publication Data

US 2023/0087619 A1  Mar. 23, 2023

Related U.S. Application Data

(62) Division of application No. 17/109,528, filed on Dec. 2, 2020, now Pat. No. 11,536,940, which is a division of application No. 16/056,860, filed on Aug. 7, 2018, now Pat. No. 10,884,228, which is a division of application No. 13/333,938, filed on Dec. 21, 2011, now Pat. No. 10,048,480.

(Continued)

(51) Int. Cl.
*G02B 21/06* (2006.01)
*G02B 21/00* (2006.01)
*G02B 21/36* (2006.01)

(52) U.S. Cl.
CPC ......... *G02B 21/06* (2013.01); *G02B 21/0092* (2013.01); *G02B 21/367* (2013.01)

(58) Field of Classification Search
CPC ... G02B 21/06; G02B 21/0092; G02B 21/367
USPC .................. 348/46, 79; 250/311; 359/9, 383
See application file for complete search history.

(56) References Cited

U.S. PATENT DOCUMENTS 5,376,790 A  12/1994 Linker
5,479,252 A  12/1995 Worster
(Continued)

OTHER PUBLICATIONS

Malacara, Daniel, "Optical Shop Testing", 2nd Edition, John Wiley & Sons, Inc., 1992, pp. 511-512.
(Continued)

*Primary Examiner* — Jayanti K Patel
*Assistant Examiner* — Richard B Carter
(74) *Attorney, Agent, or Firm* — Bever, Hoffman and Harms, LLP

(57) ABSTRACT

A three-dimensional (3D) microscope includes various insertable components that facilitate multiple imaging and measurement capabilities. These capabilities include Nomarski imaging, polarized light imaging, quantitative differential interference contrast (q-DIC) imaging, motorized polarized light imaging, phase-shifting interferometry (PSI), and vertical-scanning interferometry (VSI).

1 Claim, 15 Drawing Sheets

Related U.S. Application Data

(60) Provisional application No. 61/430,937, filed on Jan. 7, 2011.

(56) References Cited

U.S. PATENT DOCUMENTS

| | | |
|---|---|---|
| 6,285,498 B1 | 9/2001 | Mayer |
| 6,404,544 B1 | 6/2002 | Kuhn |
| 6,624,930 B1 | 9/2003 | Danner et al. |
| 6,967,335 B1 | 11/2005 | Dyer et al. |
| 7,034,271 B1 | 4/2006 | Sinclair et al. |
| 7,061,672 B2 | 6/2006 | Faber |
| 7,102,761 B2 | 9/2006 | De Lega et al. |
| 7,248,364 B2 | 7/2007 | Hebert et al. |
| 7,729,049 B2 | 6/2010 | Xu et al. |
| 7,944,609 B2 | 5/2011 | Xu et al. |
| 8,184,364 B2 | 5/2012 | Xu et al. |
| 8,254,023 B2 | 8/2012 | Watson et al. |
| 10,048,480 B2 | 8/2018 | Xu |
| 11,536,940 B2 * | 12/2022 | Xu .............. G02B 21/0092 |
| 2002/0012118 A1 | 1/2002 | Worster et al. |
| 2002/0015146 A1 | 2/2002 | Meeks et al. |
| 2002/0089741 A1 | 7/2002 | Kuhn |
| 2003/0021018 A1 | 1/2003 | Birk et al. |
| 2005/0007603 A1 | 1/2005 | Arieli et al. |
| 2005/0122577 A1 * | 6/2005 | Fujimoto .......... G02B 21/008 359/383 |
| 2006/0164721 A1 | 7/2006 | Uhl et al. |
| 2007/0171519 A1 | 7/2007 | Wolleschensky |
| 2007/0187595 A1 | 8/2007 | Tanaka |
| 2008/0212180 A1 | 9/2008 | Zhang |
| 2008/0266655 A1 | 10/2008 | Levoy |
| 2008/0291532 A1 | 11/2008 | Xu et al. |
| 2008/0291533 A1 | 11/2008 | Xu et al. |
| 2009/0147354 A1 | 6/2009 | Arbuckle |
| 2009/0174937 A1 | 7/2009 | Holy |
| 2010/0091362 A1 * | 4/2010 | Isozaki ............... G02B 21/367 250/311 |
| 2010/0134595 A1 | 6/2010 | Xu et al. |
| 2010/0135573 A1 | 6/2010 | Xu et al. |
| 2010/0172020 A1 | 7/2010 | Price |
| 2011/0096159 A1 | 4/2011 | Usami |
| 2011/0134521 A1 | 6/2011 | Truong |
| 2011/0267663 A1 * | 11/2011 | Murayama ............. G03H 1/08 359/9 |

OTHER PUBLICATIONS

Van Munster, E. B., et al. "Reconstruction of optical pathlength distributions from images obtained by a wide-field differential interference contrast microscope", Journal of Microscopy, vol. 188, Pt 2, Nov. 1997, pp. 149-157.

Wyant, James C., et al. "Computerized interferometric measurement of surface microstructure", Optical Inspection and Micromeasurements, SPIE, vol. 2782, Sep. 18, 1996, pp. 26-37.

Promotional brochure entitled: "Thin-Film Measurement Systems: F40", 2003 Filmetrics, Inc., Rev. 03.03, 2 pages.

* cited by examiner

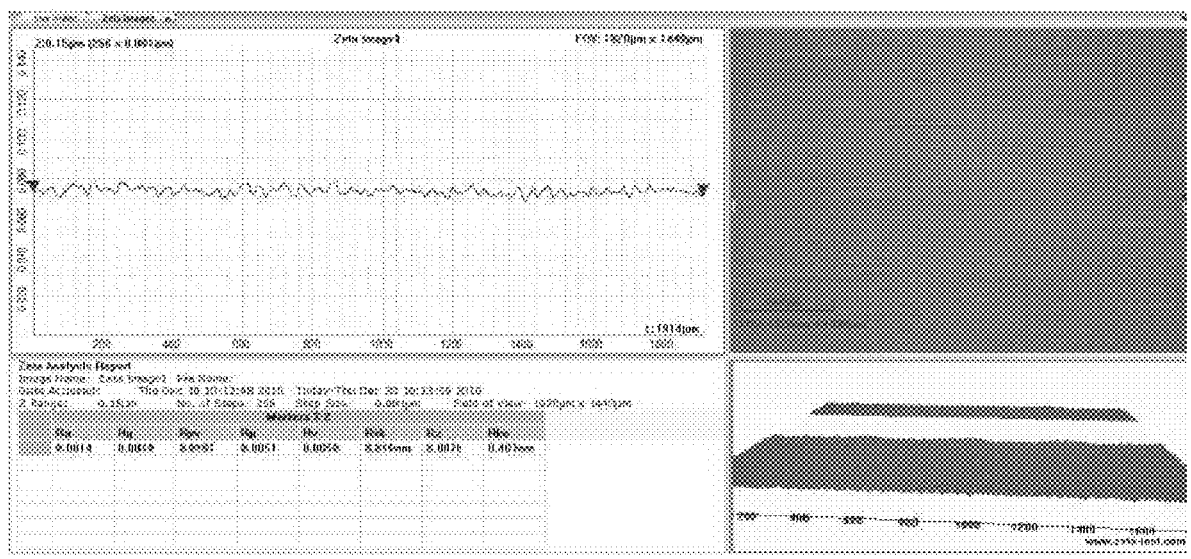
Figure 4. q-DIC image of a II-VI compound semiconductor surface

3D MICROSCOPE INCLUDING INSERTABLE COMPONENTS TO PROVIDE MULTIPLE IMAGING AND MEASUREMENT CAPABILITIES

RELATED APPLICATIONS

This application is a divisional of U.S. application Ser. No. 17/109,528 entitled "3D Microscope Including Insertable Components To Provide Multiple Imaging And Measurement Capabilities", filed Dec. 2, 2020, which is a divisional of U.S. application Ser. No. 16/056,860 entitled "3D Microscope Including Insertable Components To Provide Multiple Imaging And Measurement Capabilities", filed Aug. 7, 2018, now U.S. Pat. No. 10,884,228, which is a divisional of U.S. application Ser. No. 13/333,938 entitled "3D Microscope Including Insertable Components To Provide Multiple Imaging And Measurement Capabilities" and filed Dec. 21, 2011, now U.S. Pat. No. 10,048,480, which claims priority to U.S. Provisional Application 61/430,937 entitled "3D Imaging and Metrology System" and filed Jan. 7, 2011.

BACKGROUND OF THE INVENTION

Field of the Invention

This invention relates to optical imaging and measurement systems and more particularly to a three-dimensional (3D) microscope including insertable components that facilitate multiple imaging and measurement capabilities, including Nomarski imaging, polarized light imaging, quantitative differential interference contrast (q-DIC) imaging, motorized polarized light imaging, phase-shifting interferometry (PSI), and vertical-scanning interferometry (VSI).

Related Art

Conventional microscopes enable an operator to view magnified images of minute features on samples otherwise invisible to the human eye. Because of this, conventional microscopes have been widely used in universities, research institutes, and many industries. However, a conventional microscope has a significant limitation. Specifically, a conventional microscope only provides a two-dimensional (2D) image of a sample, while in the real world a majority of samples are 3D in nature. Therefore a need arises for a 3D microscope to capture images of those samples.

SUMMARY OF THE INVENTION

A microscope illuminator capable of generating 3-D images is provided. This microscope illuminator includes a first light source forming part of a first light path, and a second light source and a set of articles forming part of a second light path. The set of articles can include a plurality of patterned articles, and one of a through-hole and a pin-hole. The first and second light paths can have a shared set of components, which can include a first beam-splitter, a lens group, and a beam-splitter set.

The first light source can direct light onto the first beam-splitter and the second light source can direct light via one of the set of articles onto said first beam-splitter. A surface of the one article can be located at an effective focal plane of said lens group. The lens group can image the first light source and the second light source at an entrance pupil of a microscope objective lens via the beam-splitter set. The beam-splitter set can include a second beam-splitter and a pair of beam-splitters mounted on a first linear slider linked to a first pull lever.

The microscope illuminator can further include a focusing lens and a multi-pin connector. The beam-splitter set and the focusing lens can form part of a third light path for directing light to an external connector. The multi-pin connector can link electronically to the first and second light sources.

The set of articles can be mounted on a second linear slider linked to a second pull lever. Each patterned article can be transparent material with a pattern formed on one of its surfaces. In one embodiment, the first and second light sources are light emitting diodes (LEDs).

A housing for the microscope illuminator can include a slot for inserting one of a plurality of components, wherein when inserted, each component is positioned to form part of the first and the second light paths. One of the components can be a polarizer assembly including an adjustable polarizer. For Nomarski imaging, this polarizer is set at a fixed orientation, and the second linear slider is positioned such that one of the patterned articles or the through-hole is in the first light path. For polarized light imaging applications, an orientation of the polarizer is adjustable, and the second linear slider is positioned such that one of the patterned articles or the through-hole is in the second light path.

Another of the components can be an assembly including a polarizer with a motorized rotator and a quarter wave plate, wherein the motorized rotator is connected to the multi-pin connector. The motorized rotator can be controlled remotely by a recipe, the recipe being based on observation type and particular sample imaging. For quantitative differential interference contrast (q-DIC), the polarizer is stepped through a predetermined number of consecutive steps having a predetermined phase shift. In one embodiment, another of the components can be a wavelength filter assembly including a through-hole and a narrow band filter.

A 3D microscope is also provided. This 3D microscope can include an illuminator capable of generating 3D images of a sample, the illuminator including a first slot for a first component. A turret can be mounted on the illuminator, wherein the turret can include a second slot for second component. An objective lens can be mounted on the turret. A tube lens and adaptor can be mounted on the illuminator, wherein the adaptor can include a third slot for third components. An optical sensor and optical sensor coupler can be mounted on the tube lens and adaptor, wherein the optical sensor can be configured to acquire images of the sample. A processor is included for controlling the illuminator and the optical sensor, wherein the first, second, and third components facilitate Nomarski imaging, and the first and third components facilitate polarized light imaging.

The optical sensor can include one of a charge-coupled device (CCD) camera and a complementary metal-oxide semiconductor (CMOS) camera. The optical sensor coupler can provide a plurality of magnifications for the optical sensor. A spectrometer can be coupled to the illuminator, wherein light for the spectrometer is collected via a path independent of an imaging path leading to the optical sensor. The 3D microscope can also include a focusing adjustment device that provides a plurality of Z step adjustments to the sample. In one embodiment, the focusing adjustment device can be mounted on one of a sample chuck and the turret.

The objective lens can include a Michelson interference objective lens and/or a Mirau interference objective lens mounted on the turret. For vertical-scanning interferometry (VSI), the first component can include a filter assembly positioned with a through-hole in an illumination light path, and the positioning means can be configured to move the sample in the Z direction while the optical sensor captures interferograms, thereby creating a true-color 3D image of the sample. For phase-shifting interferometry (PSI), the first component can include a filter assembly positioned with a filter in an illumination light path, and the positioning means can be configured to make four phase shift moves while the optical sensor captures four interferograms. The turret, when rotated to operate without the objective lens, can transform the 3D microscope into an autocollimator.

A method of 3D imaging or measuring a patterned substrate sample is also provided. The method can include varying a relative distance between the patterned substrate sample and an objective lens at predetermined steps. At first predetermined steps, an image of a patterned article can be projected onto a focal plane of the objective lens. A first image with a pattern associated with the patterned article and the sample can be captured and then stored in a first image array. At second predetermined steps, wherein the second predetermined steps have a different number of steps than the first predetermined steps, a second image of the sample without the pattern associated with the patterned article can be captured and then stored in a second image array. The first and second images can be analyzed to 3D image or measure the patterned substrate sample.

The number of second predetermined steps can be less than that of the first predetermined steps. The first and second predetermined steps can be allocated to specific levels. The first and second predetermined steps can skip predetermined levels of the sample. At least one of the first and second predetermined steps can have uneven steps.

Another method of 3D imaging or measuring a patterned substrate sample is provided. In this method, a relative distance between the patterned substrate sample and an objective lens can be varied at predetermined steps. At first predetermined steps, an image of a patterned article can be projected onto a focal plane of the objective lens. A first image with a pattern associated with the patterned article and the sample can be captured and then stored in a first image array. At second predetermined steps, wherein the second predetermined steps have a different number of steps than the first predetermined steps, a second image of the sample without the pattern associated with the patterned article can be captured and then stored in a second image array. The first and second images can be analyzed to 3D image or measure the patterned substrate sample. The method can further include performing a downward scan and an upward scan to determining drooping effects, and then providing resulting step height values when analyzing the first and second images.

A method of repositioning a sample to minimize tilt is also provided. In this method, a light source of a 3D microscope can be turned on, wherein the light source passes through a pin-hole, and the 3D microscope is transformed into an autocollimator. When an image of the pin-hole falls inside a field of view, a tip/tilt mechanism of a stage of the 3D microscope can be adjusted so that the pin-hole image coincides with a pre-defined circle on an otherwise pitch dark field of view, thereby completing alignment. When the image of the pin-hole falls outside the field of view, a one-pass 3D imaging acquisition process and adjustment of the stage can be performed based on the process to bring the image of the pin-hole into the field of view. Then, the tip/tilt mechanism of the stage of the 3D microscope can be adjusted so that the pin-hole image coincides with the pre-defined circle on the otherwise pitch dark field of view, thereby completing alignment.

Another method of repositioning a sample to minimize tilt is also provided. In this method, a light source of a 3D microscope can be turned on, wherein the light source passes through a pin-hole, and the 3D microscope can be transformed into an autocollimator. When an image of the pin-hole falls inside a field of view, a tip/tilt mechanism of a stage of the 3D microscope can be adjusted so that the pin-hole image coincides with a pre-defined circle on an otherwise pitch dark field of view, thereby completing alignment. When the image of the pin-hole falls outside the field of view, the tip/tilt mechanism can be coarse adjusted while watching for the pin-hole image to appear within the field of view. Then, the tip/tilt mechanism of the stage of the 3D microscope can be fined adjusted so that the pin-hole image coincides with the pre-defined circle on the otherwise pitch dark field of view, thereby completing alignment.

BRIEF DESCRIPTION OF THE DRAWINGS

FIG. 4 shows a limited q-DIC image of an II-VI compound semiconductor wafer surface acquired on an implemented system conforming to that of FIG. 2B.

DETAILED DESCRIPTION OF THE DRAWINGS

State of the art 3D imaging and measurement techniques are set forth in commonly assigned U.S. Pat. Nos. 7,729,049 and 7,944,609 as well as co-pending U.S. Published Applications 20100135573 and 20080291533, all of which are incorporated entirely herein by reference.

As described in further detail below, 3D data acquisition methods can further include capabilities such as film thickness measurement, white light interferometry, Nomarski or differential interference contrast (DIC), and polarized light imaging.

Figure 1A:
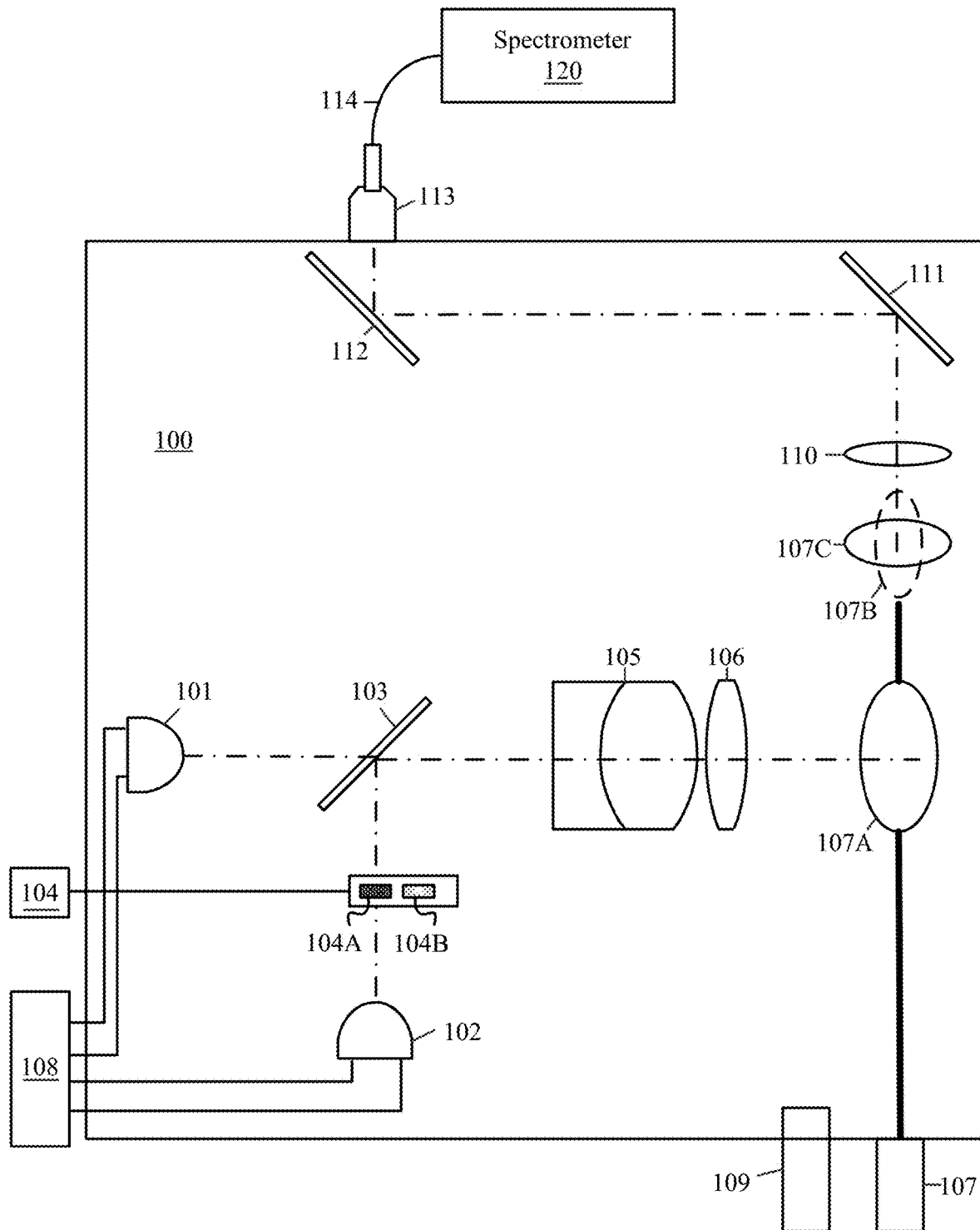
FIG. 1A illustrates an exemplary illuminator used in a 3D imaging and metrology system.

FIG. 1A illustrates an exemplary illuminator 100 that can be used in a 3D imaging and metrology system of the present invention. Illuminator 100 contains two light sources 101 and 102. In one embodiment, light sources 101 and 102 can include high brightness white color light emitting diodes (LEDs). Other light sources such as halogen lamps, fiber coupled lights, lasers, and etc. can also be used.

Light sources 101 and 102 form two light paths as illustrated by the dot-dashed lines in the lower half of FIG. 1A. These two light paths define the basic 3D imaging mode of operation of the system. Both light paths share several components, namely a first beam-splitter 103, an achromat doublet lens 105, a double convex lens 106, and a second beam-splitter 107A. Note that in other embodiments, lenses 105 and 106 can be implemented with other types of lenses providing similar optical functions. Light source 102 launches a second light path which includes light source 102, a patterned article 104A or 104B, and the shared components mentioned earlier. Patterned articles 104A and 104B are mounted on a linear slider 104. Although a linear slider is the simplest way in this case to mount patterned articles 104A and 104B, other types of multi-position fixtures such as a circular turret and etc. can also be used and are within the scope of this invention.

Beam-splitter 107A is mounted on a linear slider 107 linked to a pull lever, as are two other beam-splitters 107B and 107C. In one embodiment, linear slider 107 can be implemented by a detent spring plunger that stops at two predefined positions, i.e. with beam-splitter 107A positioned to direct the beam or beam-splitters 107B/107C positioned to direct the beam. Thus, beam-splitters 107A, 107B, and 107C will not be in the path at the same time. The term "beam-splitter set", as used herein, refers to beam-splitter 107A individually or beam-splitters 107B and 107C in combination. As described in further detail below, beam-splitter 107A is positioned to direct the illuminating light downward to an objective and then direct the returning light reflected from the sample to a camera. When beam-splitters 107B and 107C are in the path, beam-splitter 107B directs illuminating light downward to the objective and then directs the returning light reflected from the sample to beam-splitter 107C, which has an orientation different than that of beam-splitter 107B. In this orientation, beam-splitter 107C can direct part of the returning beam to lens 110. In one embodiment, the diameter of beam-splitter 107A is 1.0 inch while that of beam-splitters 107B/107C is 0.5 inches.

The optical components of illuminator 100 are typically mounted inside a dark enclosure with two openings (not shown): a top opening and a bottom opening. The top opening can be directly above beam-splitter 107A, while the bottom opening can be directly below beam-splitter 107A. These two openings allow light from both light paths to interact with other system components that do not belong to illuminator 100. A multi-pin connector 108 is linked to light sources 101 and 102 via electrical wires.

Figure 1B:
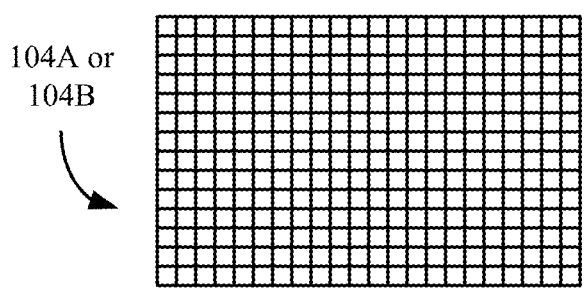
FIG. 1B illustrates an exemplary patterned article for use in a 3D imaging and metrology system.

FIG. 1B illustrates an exemplary patterned article 104A or 104B. The patterned article can be a piece of glass, liquid crystal, or photographic film (i.e. the substrate) with a two dimensional array of evenly spaced opaque dots formed on one of its surfaces. Different types of patterns such as a grid, diamonds, etc. can also be used. Indeed, any pattern will work as long as it satisfies the following conditions: (1) it has high contrast, (2) it is either regular or random, (3) it is semi-transparent, and (4) its minimum feature size matches sampling resolution of an imaging optical sensor used. The patterned surface of the patterned article is located at the effective focal plane of the lens group, i.e. lenses 105 and 106. As described in further detail below, the patterned article can be used in the illuminator to project an image of the pattern onto the focal plane of an objective lens to create enough contrast such that 3D height information of a sample can be obtained.

Notably, patterned articles 104A and 104B, which differ in pattern pitch, can be selected to match specific optical sensor/coupling lens combinations to achieve optimized imaging results. Depending on the circumstances, linear slider 104 can position patterned article 104A or patterned article 104B in the light path. Plug 109 can fill an open slot on one side of illuminator 100, such slot being reserved for components that can provide Nomarski or DIC, polarized light, and phase-shifting interference imaging, all of which is discussed below.

A third light path, as illustrated by the dot-dashed lines in the upper half of FIG. 1A, can be used in a film thickness measurement mode of operation. In this mode, linear slider 107 is positioned so that beam-splitters 107B and 107C are in the illumination light path (i.e. instead of beam-splitter 107A). Light from light source 101 passes through beam-splitter 103, lenses 105 and 106, and is directed by beam splitter 107B to travel downward into an objective lens (described in reference to FIG. 2A). The light hits the sample surface, reflects back, then goes through the objective lens, beam splitter 107B, and beam-splitter 107C. Beam-splitter 107C then directs the light horizontally towards a focusing lens 110. After lens 110, the converging beam makes two 90-degree turns upon hitting mirrors 111 and 112, and focuses near the exit of a connector 113. The focused light beam then enters a fiber cable 114 and is collected by a spectrometer 120, which is connected to fiber cable 114.

Figure 1C:
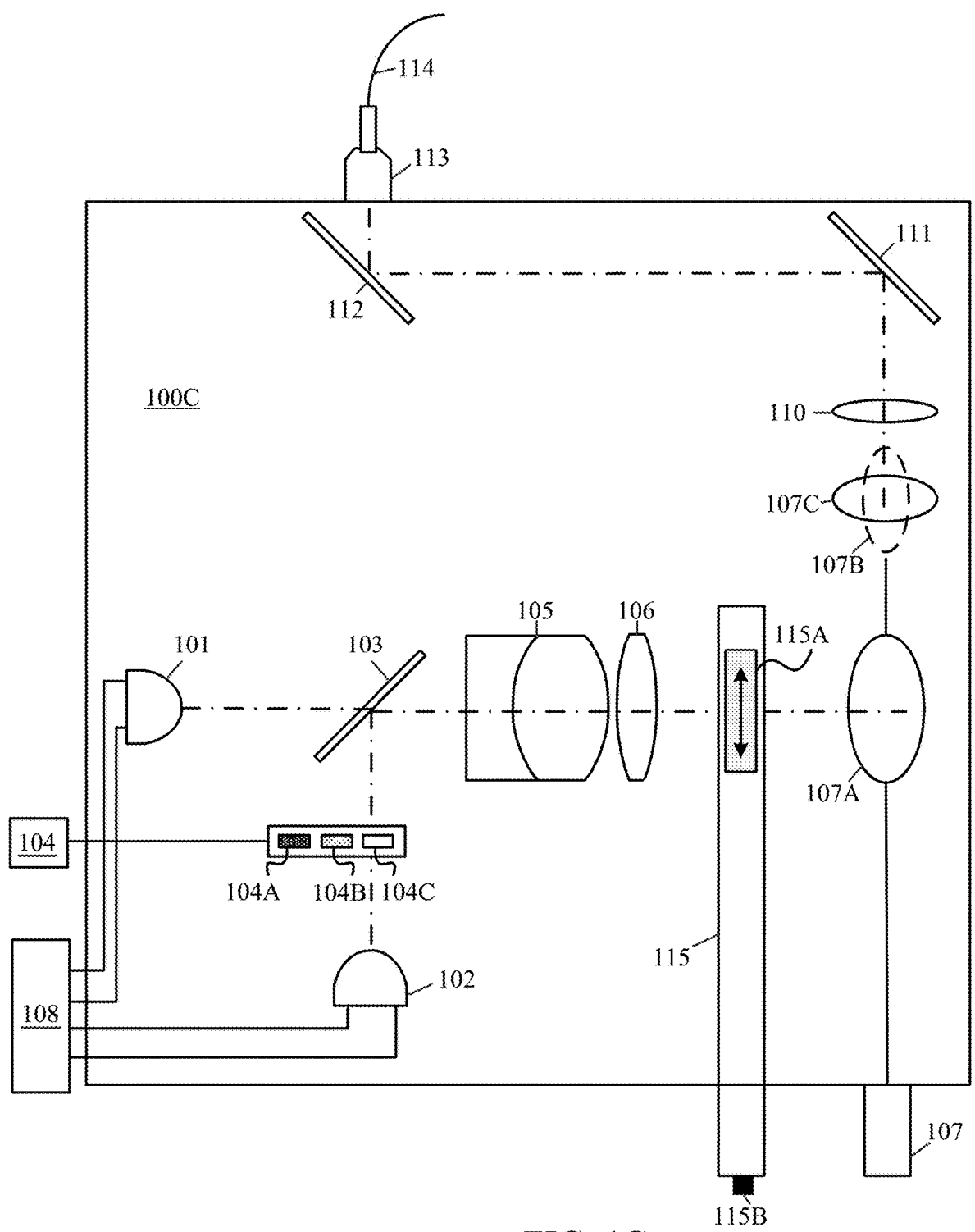
FIG. 1C illustrates an exemplary illuminator configured for Nomarski and polarized light imaging.

FIG. 1C shows an exemplary illuminator 100C configured for Nomarski and polarized light imaging. In this configuration, patterned articles 104A and 104B as well as a through-hole 104C are mounted on a linear slider 104, and a polarizer assembly 115 replaces plug 109 (FIG. 1A). Through-hole position 104C is useful in certain Nomarski or polarized light imaging applications when maximum illumination light intensity is required for very small defect detection and light source 101 is insufficient for such detection. Thus, using through-hole position 104C allows the light from both light sources 101 and 102 to be combined. The orientation of a polarizer 115A can be adjusted via a thumb knob 115B for polarized light imaging applications. When used for Nomarski imaging, however, polarizer 115A is set at a fixed orientation. Note that for either Nomarski or polarized light imaging, linear slider 104 could be positioned such that through-hole 104C is in the light path to maximize the amount of illumination light on the sample (for example, for detection of tiny defects on a flat hard-drive disk surface). Otherwise, to acquire a 3D image, either pattern 104A or pattern 104B can be positioned in the path including light source 102].

Figure 1D:
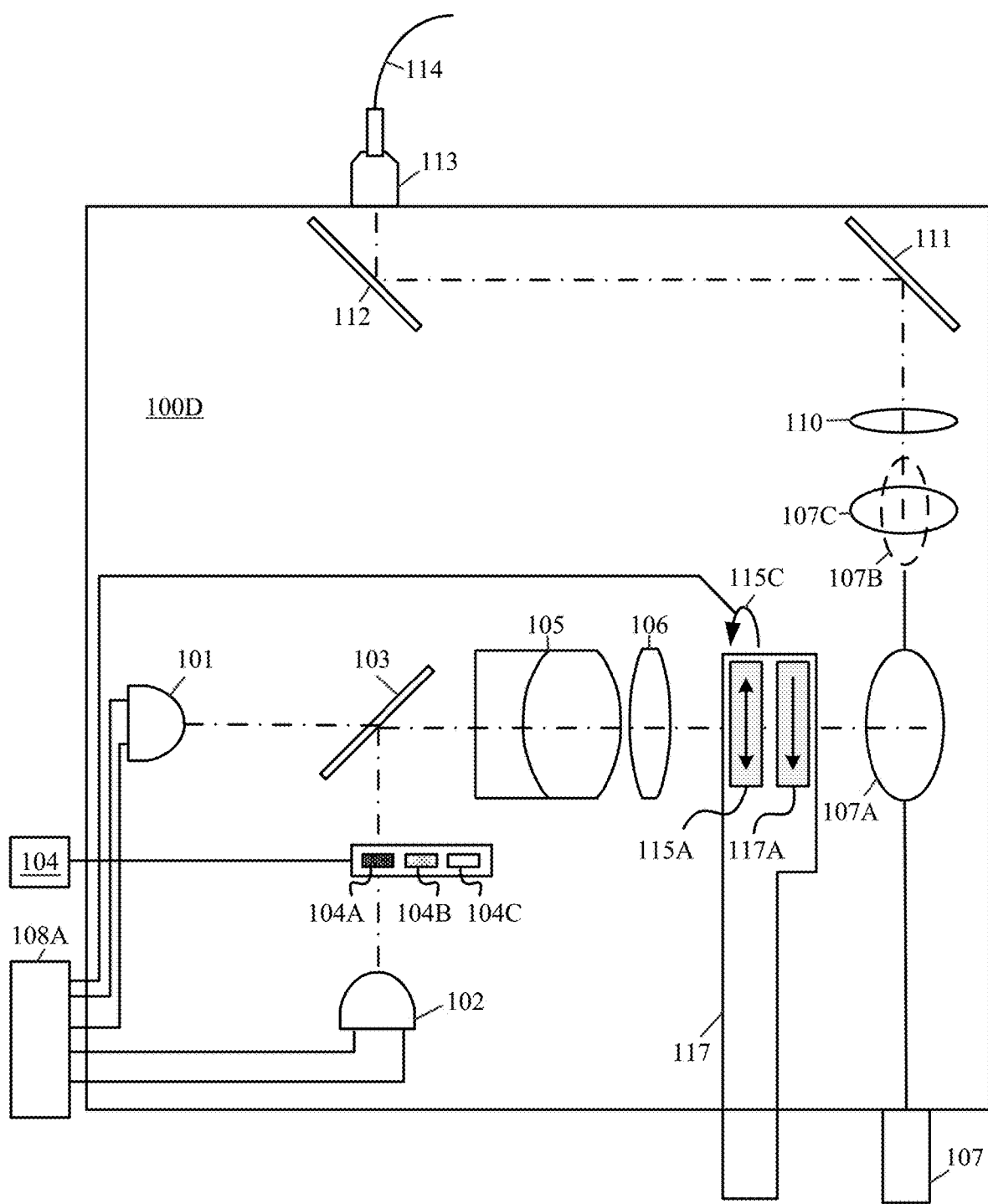
FIG. 1D illustrates an exemplary illuminator configured for quantitative differential interference contrast (q-DIC) and motorized polarized light imaging.

FIG. 1D illustrates an exemplary illuminator 100D configured for quantitative differential interference contrast (q-DIC) and motorized polarized light imaging. In this configuration, plug 109 (FIG. 1A) is replaced by an assembly 117 including polarizer 115A, which is mounted on a motorized rotator 115C, and a quarter wave plate 117A. Multi-pin connector 108 (FIG. 1A) is replaced by multi-pin connector 108A, which links to light sources 101 and 102, as well as to motorized rotator 115C. The orientation of polarizer 115A can be adjusted quasi-continuously via motorized rotator 115C for polarized light imaging applications. However, when used for q-DIC imaging (described below), polarizer 115A can be stepped through five consecutive positions equally spaced at 45° intervals or any other number/phase shift steps to extract phase information in q-DIC. Because the orientation of polarizer 115A can be adjusted remotely, software can create specific recipes for both polarized and q-DIC observation as well as imaging of particular samples. For example, when an operator routinely inspects plastic samples for residual stress and scratch defects, the inspector typically rotates the polarizer to one orientation to examine the stress and then rotates the polarizer to another orientation to see the scratch defect. This process is tedious and error-prone.

In contrast, the operator can store the best polarizer orientation settings for stress inspection and scratch detection in recipe files. The operator can then load these recipes preceding stress inspection and/or scratch detection to ensure that the system is optimally configured for those jobs. Advantageously, with these recipes, a motorized rotator, and software (executable by a processor or computer), stress or scratches can be detected without any human intervention. This illuminator configuration can greatly enhance the ease of use of the system, reduce operator-related errors, and improve data reliability.

Figure 1E:
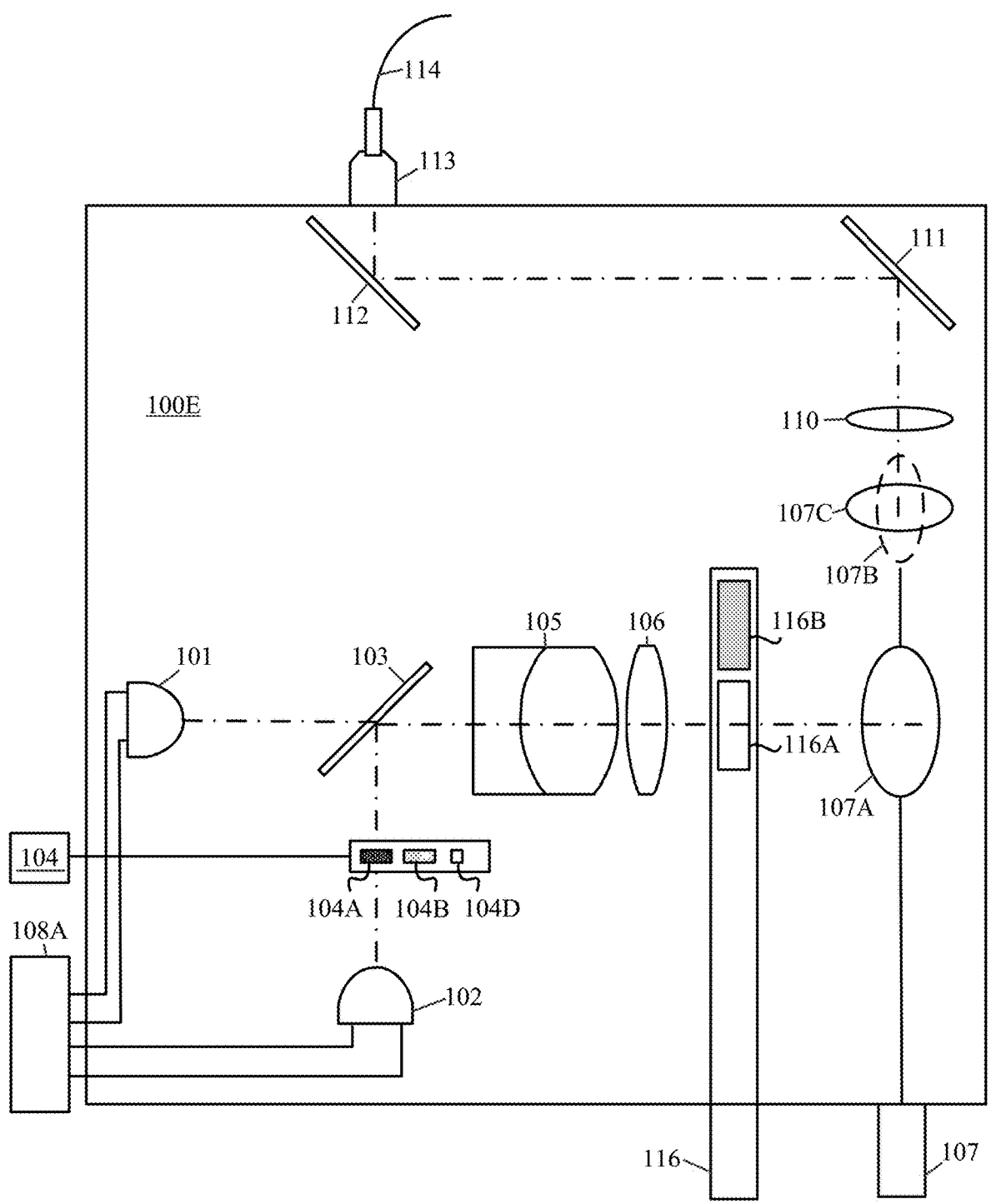
FIG. 1E illustrates an exemplary illuminator configured for phase-shifting interferometry (PSI) and vertical-scanning interferometry (VSI).

FIG. 1E illustrates an exemplary illuminator 100E configured for phase-shifting interferometry (PSI) and vertical-scanning interferometry (VSI). In this configuration, plug 109 (FIG. 1A) is replaced by a wavelength filter assembly 116, which includes a through-hole 116A and a narrow band filter 116B, and through-hole 104C (FIG. 1A) is replaced by a pin-hole 104D. By sliding filter assembly 116 in and out, either through-hole 116A or narrow band filter 116B can be positioned in the illumination light path, thereby enabling either VSI or PSI imaging (discussed below).

Figure 2A:
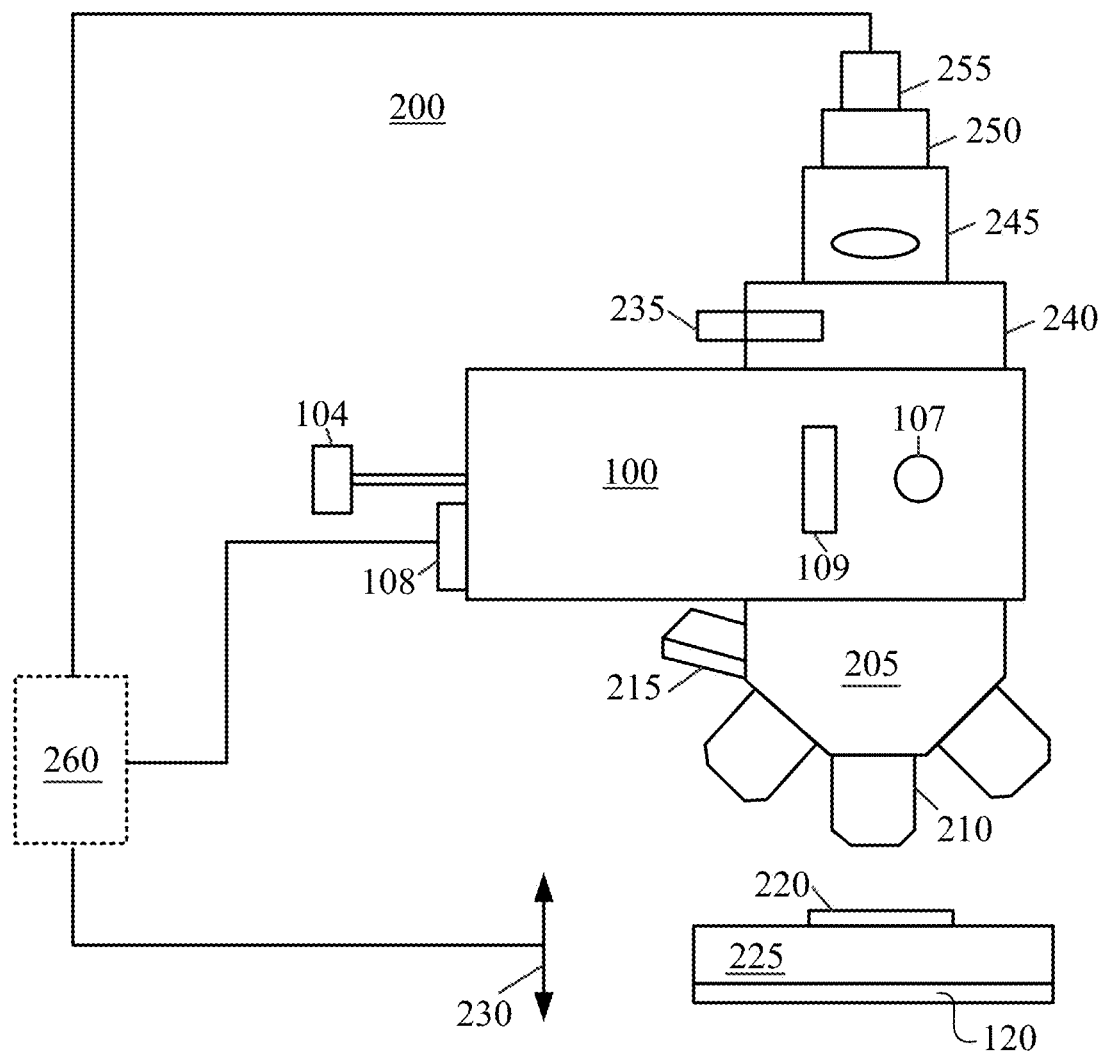
FIG. 2A illustrates an exemplary 3D imaging and metrology system, which includes an illuminator configured for film thickness measurement.

FIG. 2A illustrates an exemplary 3D imaging and metrology system 200 in accordance with the present invention. System 200 includes illuminator 100, which is shown in side view. Because illuminator 100 provides reflected illumination, it is called a reflected illuminator. To avoid cluttering, only those illuminator components that are visible from the outside are shown in FIG. 2A.

Referring to both FIGS. 1A and 2A, a microscope objective lens 210 is mounted on a turret 205. Turret 205 is mounted directly below the bottom opening of illuminator 100. When light source 101 or 102 is turned on and beam-splitter 107A is in the illumination light path, the lens group formed by lenses 105 and 106 projects an image of the light source onto the entrance pupil of microscope objective lens 210, thereby ensuring uniform illumination on a sample 220. When light source 102 is turned on and beam-splitter 107A is in the illumination light path, the lens group formed by lenses 105 and 106 projects an image of the pattern on patterned article 104A or 104B onto the focal plane of objective lens 210.

A positioning means 230 is provided to change the relative position between sample 220 and objective lens 210. As a result, different features on the sample can be brought into focus of objective lens 210. A manual or motorized XY stage 225 can be incorporated into system 200 to move sample 220 in the horizontal plane. In preferred embodiments, positioning means 230 is either a motorized Z stage or a motorized Z stage and a piezo-Z stage combination. Other embodiments may use other ways to vary the relative position between sample 220 and objective lens 210. For example, objective lens 210 could be mounted on a piezo-electric actuator. In such an arrangement, sample 220 remains stationary while objective lens 210 moves up and down.

A tube lens 245 and optical sensor coupler 250 (together called a "coupler" in U.S. Pat. Nos. 7,729,049 and 7,944,609 as well as U.S. Published Applications 2010/0135573 and 2008/0291533) in conjunction with objective lens 210 yields an image of sample 220 on an optical sensor 255. In preferred embodiments, optical sensor 255 is either a charge-coupled device (CCD) or a complementary metal-oxide-semiconductor (CMOS) camera. Plugs 215 and 235 can fill the open slots in tube lens adaptor 240 and turret 205, respectively. In other system embodiment, described below, these slots can be used for Nomarski and polarized light imaging. A processor 260 can be connected to system 200 (in some embodiments, processor 260 can form part of the system). Processor 260 can be used to control positioning means 230, illuminator 100, a spectrometer (not shown), and optical sensor 255. In addition, processor 260 can analyze data and create a 3-D image of the sample. In one embodiment, processor 260 is a personal computer.

In the film thickness measurement mode, described in reference to FIG. 1A, broadband surface reflectance data is collected for sample 220 as well as for a known standard, such as a polished silicon wafer. Using this data, processor 260 can analyze the reflection spectrum provided by spectrometer 120 and calculate a film thickness value and optical index of refraction of a thin film (if present) on sample 220.

This film thickness measurement is based on a broadband spectrophotometry method. There are several ways to implement this method. One exemplary method is disclosed in U.S. Pat. No. 7,248,364, which issued to Hebert on Jul. 24, 2007. Another method is disclosed by Filmetrics, Inc. in their "F40 Thin-Film Measurement Systems" brochure. Note that although, the F40 system also uses microscope optics to achieve a small measurement spot size, reflected light for their spectrometer is collected at the image light path, i.e. at a location equivalent to between tube lens adaptor 240 and optical sensor coupler 250 (FIG. 2A). Moreover, the camera coupler of the F40 system is a custom-made part that contains a 45-degree beam splitter to direct part of the return light towards a camera, which is mounted horizontally to one side of the camera coupler body.

In contrast, in system 200, reflected light for spectrometer 120 is collected via a third optical path inside illuminator 100 that is independent of the imaging path leading to optical sensor 255. Notably, optical sensor coupler 250 can be implemented with standard industry components having a plurality of magnifications, all at relatively low cost. Thus, compared to system 200, the F40 system suffers several significant disadvantages. First, the custom-made camera coupler of the F40 system contains no lens and therefore is 1× in magnification, thereby limiting the imaging field of view to only one size for each objective lens. Second, if custom camera couplers with different magnifications are desired, the resulting cost will be very high. Third, even if the F40 system had expensive camera couplers custom made, swapping among them will be inconvenient because the collection fiber (i.e. the equivalent of fiber 114 in FIG. 1A) has to be removed first and then re-installed after every swap. As a result, fiber alignment (i.e. lateral and focus adjustment) has to be performed for every swap. Fourth, the 45-degree beam splitter in the camera coupler of the F40 system is in a converging beam path. As such, the beam splitter will introduce aberration, which in turn will impact the shape of the focused light spot at the fiber entrance and reduce light collection efficiency.

Figure 2B:
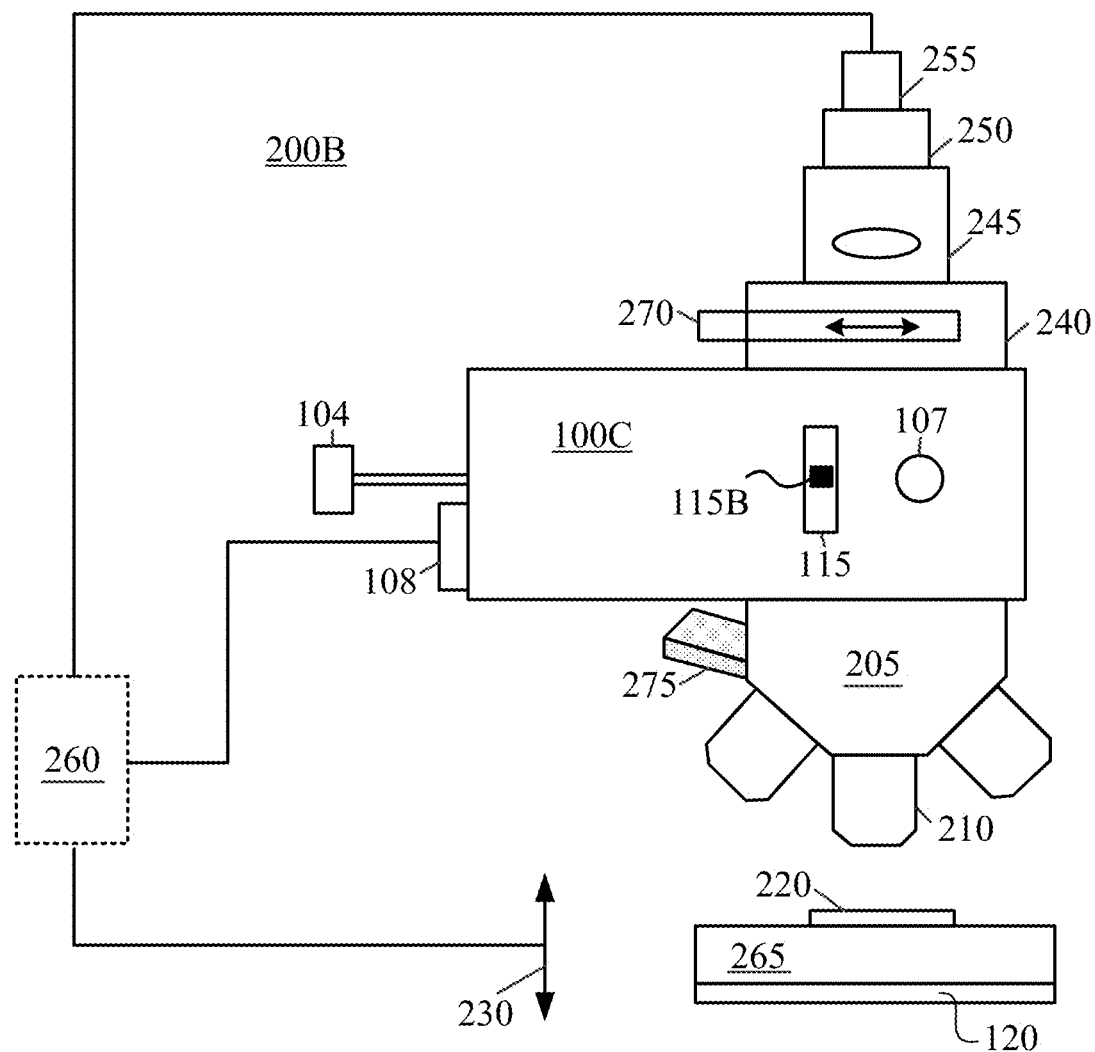
FIG. 2B illustrates another exemplary 3D imaging and metrology system, which includes an illuminator configured for Nomarski and polarized light imaging.

FIG. 2B illustrates another exemplary 3D imaging and metrology system 200B in accordance with the present invention. System 200B includes illuminator 100C (FIG. 1C), which is configured for Nomarski and polarized light imaging. Referring to FIGS. 1C and 2B, a microscope objective lens 210 suitable for Nomarski and polarized light imaging is mounted on turret 205. Turret 205 is mounted directly below the bottom opening of illuminator 100C. When light source 101 or 102 is turned on, the lens group formed by lenses 105 and 106 projects an image of the light source onto the entrance pupil of microscope objective lens 210, thereby ensuring uniform illumination on sample 220. When light source 102 is turned on, the lens group formed by lenses 105 and 106 projects an image of the pattern on patterned article 104A or 104B onto the focal plane of objective lens 210.

In Nomarski or DIC imaging mode, light from light source 101 and/or 102 passes through polarizer 115A. The resulting linearly polarized light waves travel downward upon hitting beamsplitter 107A. These light waves then enter a Nomarski prism 275 (replacing plug 215 of FIG. 2A) located above objective 210 in turret 205. In Nomarski prism 275, the light waves are sheared into two orthogonal components, i.e. the ordinary and extraordinary wavefronts. Objective 210 focuses these two wavefronts onto the surface of sample 220 where their paths are altered due to morphology and/or refractive indices change on the surface.

The reflected wavefronts are gathered by objective 210 and travel upward through Nomarski prism 275 where they are recombined to eliminate shear. They pass through beamsplitter 107A and then encounter an analyzer 270, which is positioned with its transmission axis orthogonal to that of polarizer 115A. Wavefront components that are filtered by analyzer 270 pass through tube lens 245 and optical sensor coupler 250, and subsequently undergo interference in the image plane to form the so-called Nomarski image or differential interference contrast (DIC) image on optical sensor 255. If Nomarski prism 275 is adjusted for maximum extinction, then the resulted DIC image often has a dark background and exhibits very high sensitivity to slight phase gradients present in certain sample regions. A bias retardation can be introduced by shifting Nomarski prism 275 laterally. By doing so, wavefront pairs forming the background become out of phase relative to each other and the degree of elliptical polarization is increased in the wavefronts entering analyzer 270. As a result, the background intensity becomes brighter and sample features increasingly resemble a pseudo 3D relief image with peaks and valleys depending on the phase gradient orientation. A good application of Normaski imaging is to discern features with tiny depth or height relief. Exemplary features include small defects formed during the manufacturing process of magnetic storage disks.

In the polarized light imaging mode, Nomarski prism 275 can be pulled out of the light path, and the transmission axis of polarizer 115A can be adjusted to maximize desired feature detection sensitivity via thumb knob 115B. Light from light source 101 and/or 102 passes through polarizer 115A. The resulting linearly polarized light waves travel downward upon hitting beamsplitter 107A. Objective 210 focuses the light waves onto the surface of sample 220. If the sample surface contains both polarization active and inactive materials, the reflected wavefronts emanating from the polarization active region will have their polarization orientation altered while those from the polarization inactive region will not. Polarization active materials possess certain properties such as those found on non-linear metallurgical specimens.

The reflected wavefronts are gathered by objective 210 and travel upward through beamsplitter 107A and then encounter analyzer 270 positioned with the transmission axis nearly orthogonal to that of polarizer 115A. Wavefront components that are filtered by analyzer 270 pass through tube lens 245 and optical sensor coupler 250, and subsequently form a polarized light image on optical sensor 255. Because light reflected from the polarization active region has a higher transmission rate through analyzer 270 than that of light from the polarization inactive region, one can easily discern features with different polarization properties in the image. An exemplary application for polarized light imaging is locating small defects on a data storage disk pre-marked with magnetic marking. Notably, under regular microscope imaging mode, the magnetic marking is invisible due to lack of image contrast. However, with polarized imaging, the magnetic marking is visible and can be used to locate a particular defect. Once the defect is located, it can be analyzed using a q-DIC method to ascertain whether the defect is a particle or a pit, and to obtain its height or depth.

Note that in both Nomarski and polarized light imaging modes of operation, there are cases where more illumination light than either one of the two light sources 101 and 102 can provide is needed. When this happens, linear slider 104 can be adjusted such that through-hole 104C is positioned in front of light source 102. As a result, light from both light sources 101 and 102 can be combined to illuminate sample 220, which results in maximum intensity for Nomarski or polarized light imaging application.

Positioning means 230 is provided to change the relative position between sample 220 and objective lens 210. As a result, different features on the sample can be brought into focus of objective lens 210. A manual or motorized XYθ stage 265 can be incorporated into system 200B to move and rotate sample 220 around in a horizontal plane. In one preferred embodiment, positioning means 230 is a motorized Z stage. In other embodiment, other ways to vary the relative position between sample 220 and objective lens 210 can be used. For example, objective lens 210 could be mounted on a piezoelectric actuator. In such an arrangement, sample 220 remains stationary while objective lens 210 moves up and down. Once again, processor 260 can be connected to system 200B to control positioning means 230, illuminator 100C, spectrometer 120, and optical sensor 255. In addition, processor 260 can analyze data and create a 3-D image of sample 220. In one embodiment, processor 260 includes a personal computer.

Figure 2C:
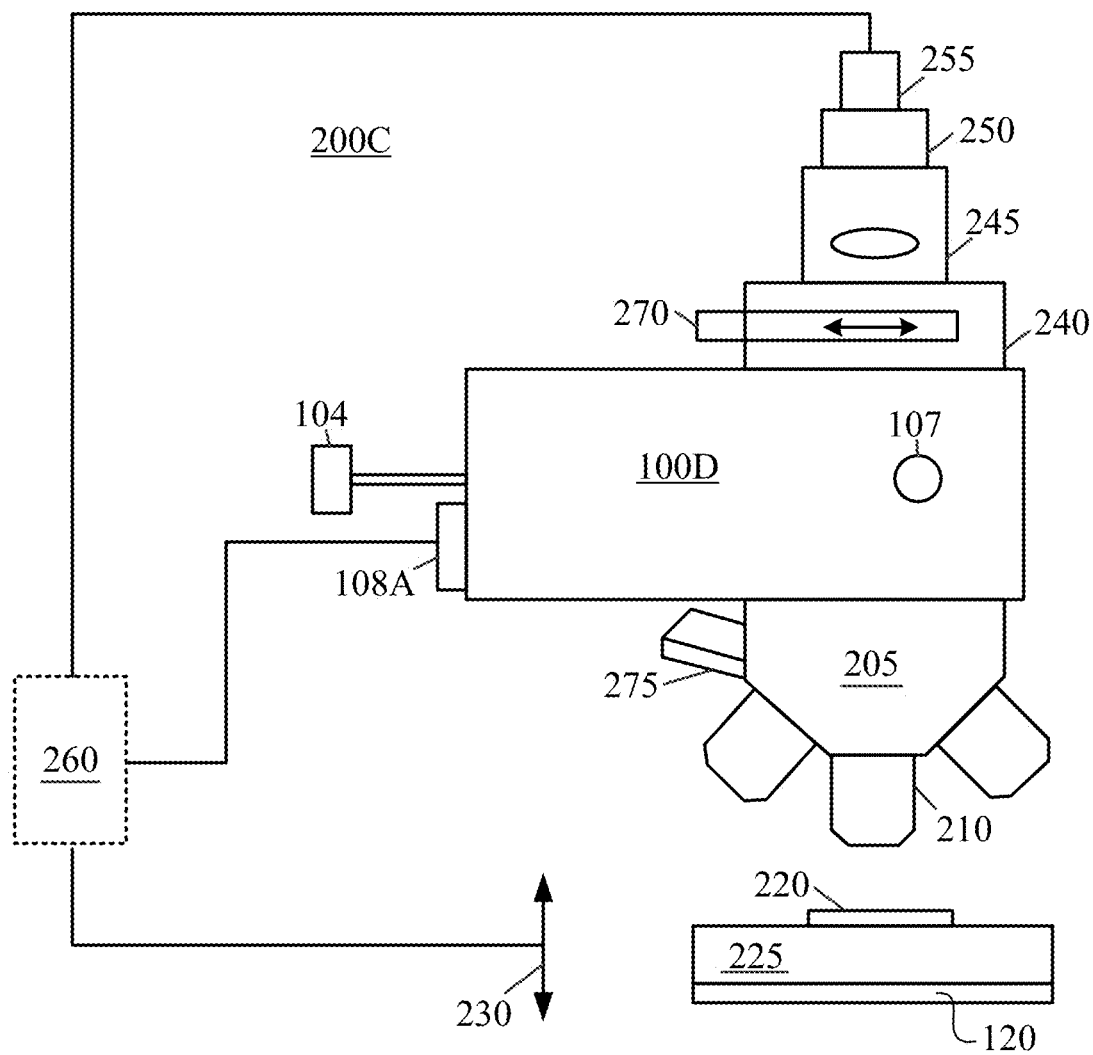
FIG. 2C illustrates another exemplary 3D imaging and metrology system, which includes an illuminator configured for q-DIC and motorized polarized light imaging.

FIG. 2C illustrates another 3D imaging and metrology system 200C, which includes illuminator 100D configured for q-DIC and motorized polarized light imaging. Referring to FIGS. 1D and 2C, illuminator 100D can provide Nomarski or DIC imaging as well as polarized light imaging (all described above). As noted previously, illuminator 100D includes assembly 117, which in turn includes quarter wave plate 117A, polarizer 115A, and motorized rotator 115C for polarizer 115A.

In operation, the fast axis of quarter wave plate 117A is fixed at a 90-degree angle with respect to the transmission axis of analyzer 270. For Nomarski or DIC imaging mode, light from light source 101 and/or 102 passes through polarizer 115A and quarter wave plate 117A. The resulting light is typically elliptically polarized unless the transmission axis of polarizer 115A coincides with the fast axis of quarter wave plate 117A, in which case, the light remains linearly polarized. Because elliptically polarized light represents a phase difference between the ordinary and extraordinary wavefronts, bias is introduced to the system when the wavefronts enter Nomarski prism 275 and become sheared. Therefore, the combination of polarizer 115A and quarter wave plate 117A enables adjustment of the bias retardation that is usually achieved through laterally shifting Nomarski prism 275. Because polarizer 115A is mounted on a motorized rotator, the amount of bias retardation can be precisely controlled, which is critical to q-DIC imaging.

Figure 2D:
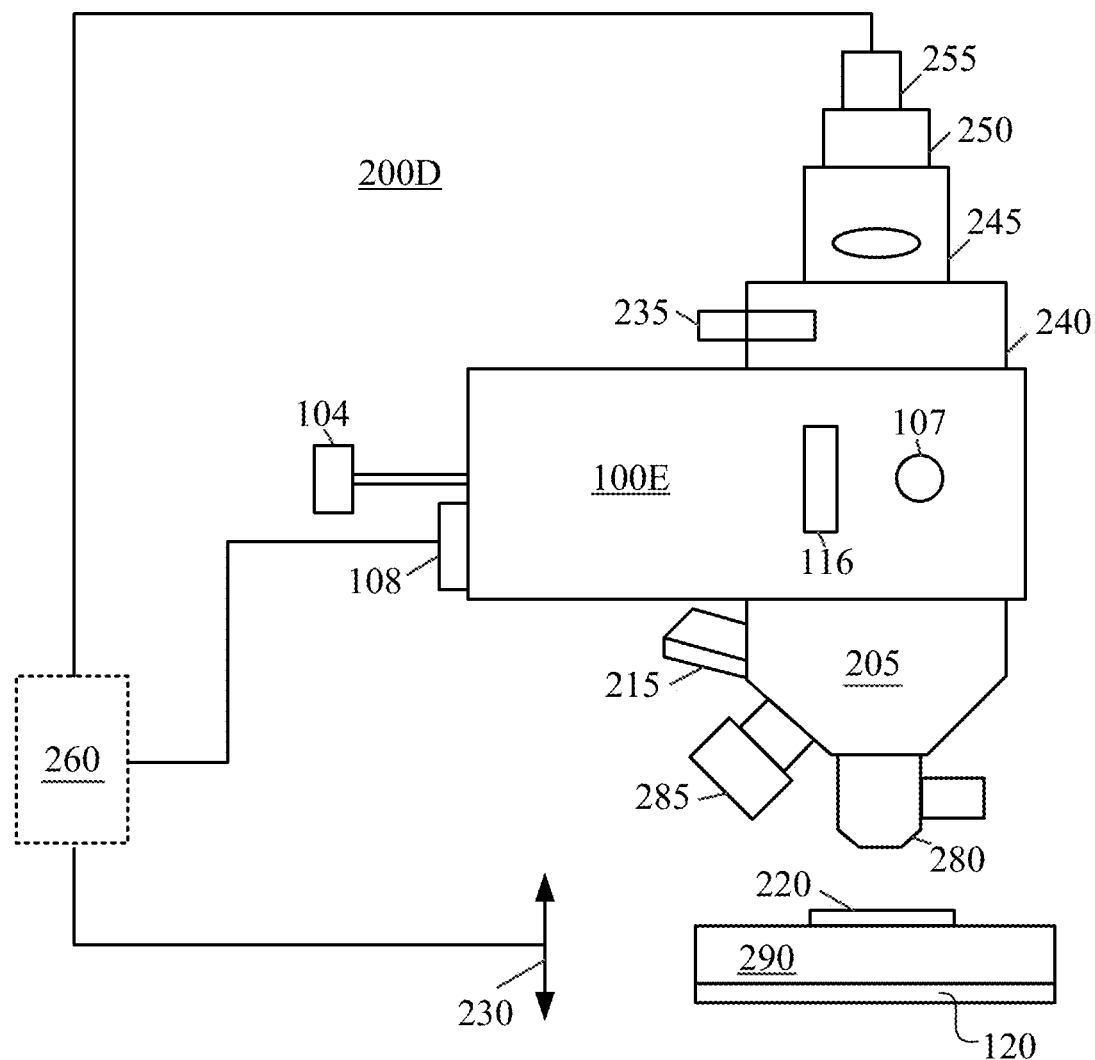
FIG. 2D illustrates another exemplary 3D imaging and metrology system, which includes an illuminator configured for phase-shifting and vertical scanning interferometry.

FIG. 2D illustrates an exemplary 3D imaging and metrology system 200D including illuminator 100E, which is configured for phase-shifting and vertical scanning interferometry. Referring to FIGS. 1E and 2D, system 200D further includes a Michelson interference objective lens 280 and a Mirau interference objective lens 285 mounted on turret 205. Michelson and Mirau interference objectives are described, for example, in "Optical Shop Testing", by Daniel Malarca, $2^{nd}$ edition, John Wiley & Sons, Inc., 1992. In general, a Michelson interference objective is used for magnifications below 10× while a Mirau interference objective is used for 10× or higher magnifications. Turret 205 is mounted directly below the bottom opening of illuminator 100E. When light source 101 or 102 is turned on, the lens group formed by lenses 105 and 106 projects an image of the light source onto the entrance pupil of interference objective lens 280 or 285, thereby ensuring uniform illumination on sample 220. When light source 102 is turned on, the lens group formed by lenses 105 and 106 projects an image of the pattern on patterned article 104A or 104B onto the focal plane of interference objective lens 280 or 285.

Positioning means 230 is provided to change the relative position between sample 220 and interference objective lens 280 or 285. A manual or motorized XY plus Tip/Tilt stage combination 290 can be incorporated into system 200D to move sample 220 around in a horizontal plane and to level the sample surface. In one preferred embodiment, positioning means 230 can include a motorized Z stage and a piezo-Z stage combination. In other embodiments, other ways to vary the relative position between sample 220 and interference objective lens 280 or 285 can be used. For example, objective lens 280 or 285 could be mounted on a piezoelectric actuator. In such an arrangement, sample 220 remains stationary while objective lens 280 or 285 moves up and down.

System 200D can select between two interference imaging modes: a vertical scanning (VSI) mode and a phase-shifting interferometry (PSI) mode. In the VSI mode, the light from light source 101 passes through beam-splitter 103, lenses 105 and 106, and through-hole 116A on filter assembly 116. The light then travels downward upon hitting beam-splitter 107A toward objective 280 or 285. Objective 280 or 285 splits light into two wavefronts, wherein one wavefront travels towards the surface of sample 220 while the other wavefront travels sideways towards the surface of a reference mirror inside objective 280 or undergoes multiple reflection between two parallel plates inside objective 285. The reflected wavefronts from both the sample and reference surfaces are gathered by objective 280 or 285 and travel upward through beam-splitter 107A, tube lens 245, optical sensor coupler 250, and subsequently undergo interference in the image plane to form an interference image on optical sensor 255. To acquire data, positioning means 230 moves sample 220 in the Z direction while optical sensor 255 captures interferograms.

The PSI mode differs from that of VSI in two aspects. First, filter 116B is placed in the illumination light path to turn white light into a very narrow band illumination light. Second, during data acquisition, the piezo-Z within positioning means 230 makes four phase shift moves (e.g. 0, $\pi/2$, $\pi$, and $3\pi/2$) while optical sensor 255 captures four interferograms. In general, PSI is used to measure surfaces flat to within one wavelength while VSI is used to measure surfaces with larger Z variations.

Prior to a PSI or VSI scan, the relative tilt between a sample surface and the interferometer system has to be adjusted. U.S. Pat. No. 7,102,761, issued to De Lega on Sep. 5, 2006, discloses three ways to carry out this type of alignment. In a first technique, the reference path is adjusted so that a minimum number of interference fringes is visible across the sample surface. In a second technique, a preliminary optical path difference (OPD) scan is performed. A least-square fit of a plane surface through the measure data can then calculates the amount of tip and tilt value that needs to be adjusted. In a third technique, an external autocollimator telescope measures the test object orientation on a fixture that it then places in front of the interferometer.

In practice, each of these three alignment methods has limitations or is not user friendly. For example, the first technique is not user friendly to a novice user because it is not easy to find interference fringes in the first place. In addition, it is not intuitive to adjust the tip/tilt knobs to minimize the number of fringes. The second technique, although automatic, requires expensive piezo-electric transducer driven mechanisms to perform the technique. The third technique, which relies on an external measurement station, assumes that a "fixture" is repeatable so that sample surface tilt at the pre-measurement station and at the interferometer correlate. In one embodiment, the fixture can be sample holder that can be placed on an external autocollimator to have the sample surface leveling adjusted. However, this assumption may be incorrect. Finally, when the amount of tilt is very large, interference fringes become so narrow that they are invisible. As such, the first and second techniques may fail to work. The third technique may also fail to work because the autocollimator has a small angular measurement range.

Figure 3A:
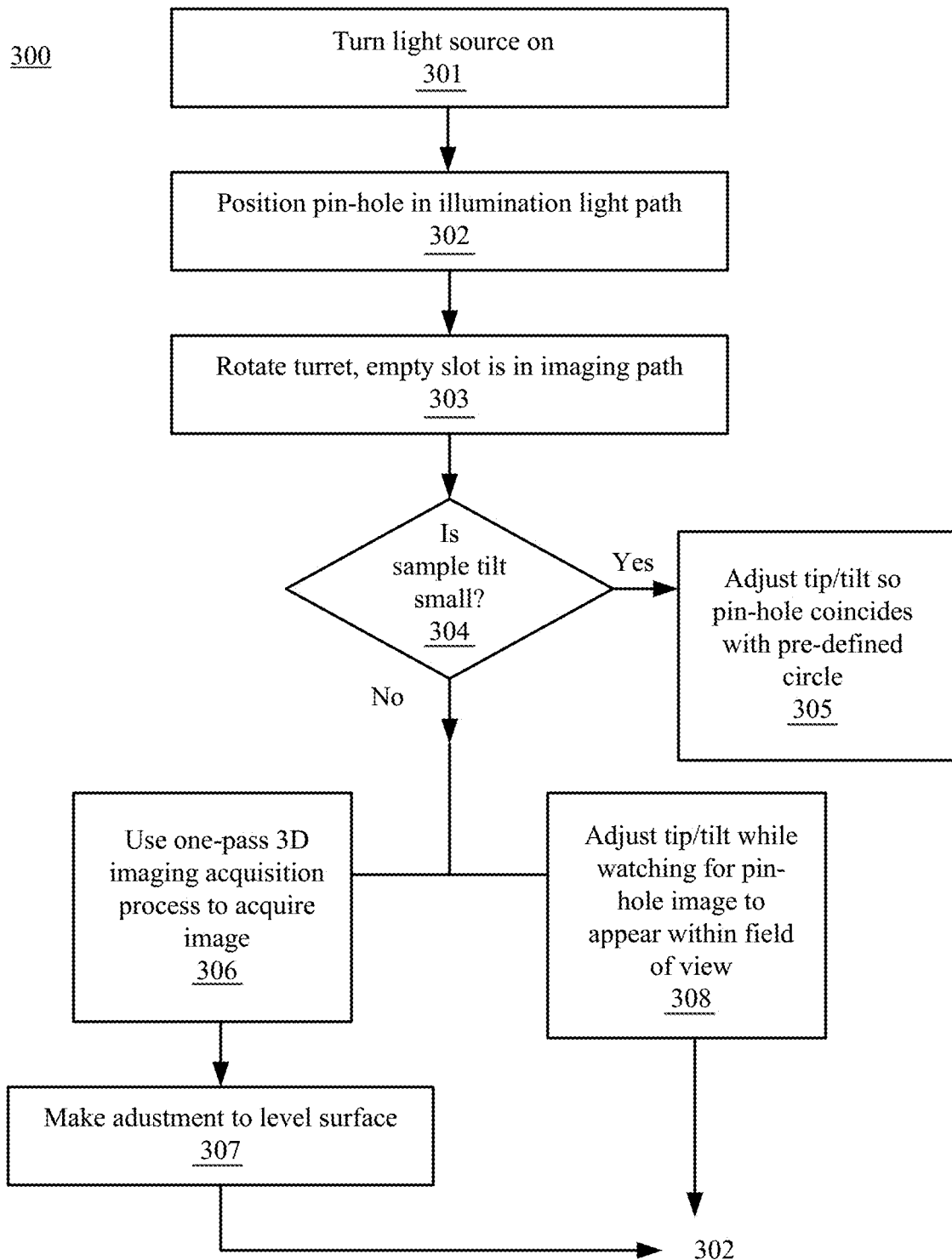
FIG. 3A illustrates an exemplary tip/tilt alignment technique.

In contrast, system 200D permits new tip/tilt alignment procedures that overcome these limitations. FIG. 3A illustrates an exemplary tip/tilt alignment technique 300. Step 301 can turn on light source 102. Step 302 can reposition linear slider 104 so that pin-hole 107D is in the illumination light path. Step 303 can rotate turret 205 so that an empty slot (i.e. one without an objective mounted) is in the imaging path, thereby transforming system 200D into an autocollimator.

If the amount of sample tilt is small, as determined by step 304, then the image of a bright pin-hole will appear in an otherwise pitch dark field of view. For example, in one embodiment, the software of processor 260 can overlay a pre-defined circle on the image screen. At this point, step 305 can adjust the tip/tilt mechanism of stage combination 290 so that the pin-hole image coincides with the pre-defined circle, thereby completing alignment.

If the amount of sample tilt is so large that the image of the pin-hole falls outside of the field of view, then either step 306 or step 308 can be used to bring the image of the pin-hole into the field of view. Step 306 performs a one-pass 3D imaging acquisition process disclosed in commonly assigned U.S. Pat. No. 7,944,609 to acquire a 3D image of the tilted surface. At that point, the software used in the process can automatically indicate how much adjustment is needed and in which direction in order to level the surface. Step 307 can make the suggested adjustment, thereby ensuring that the pin-hole image is in the field of view. At that point, technique 300 can return to step 302 to finish the alignment process.

Alternatively, step 308 can adjust the tip/tilt mechanism with a user watching for the pin-hole image to appear within the field of view. Note that searching for a bright pin-hole image in a dark background is much easier than hunting for elusive interference fringes. Once the pin-hole image is within the field of view, technique 300 once again returns to step 302 to finish the alignment process.

Notably, tip/tilt alignment technique 300 works for any amount of sample tilt. This technique is intuitive and easy to follow because visual feedback can be relied upon to move a pin-hole image to a pre-set location on the screen. The precision autocollimator is built into system 200D, so there is no uncertainty in the alignment result.

Figure 6:
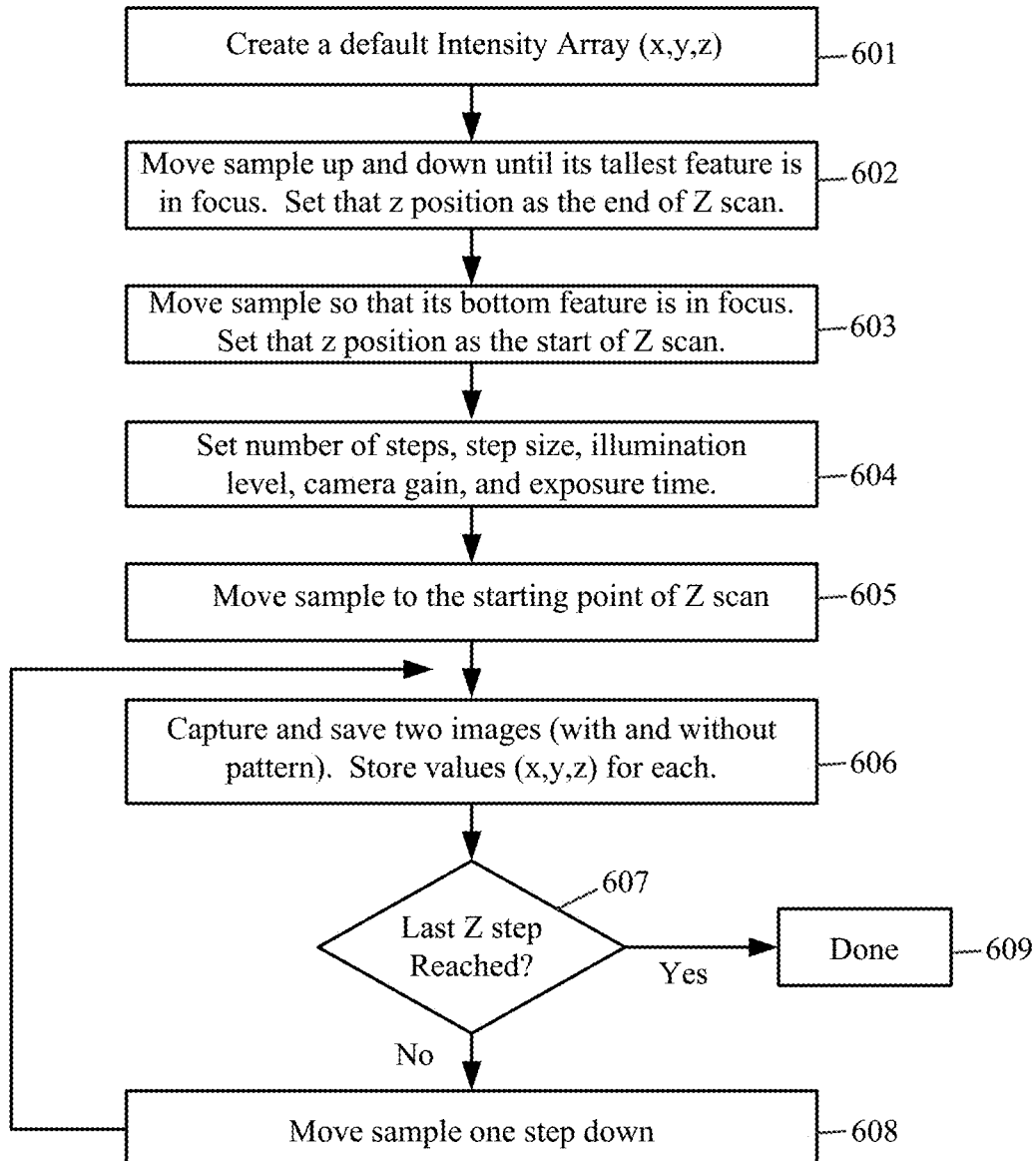
FIG. 6 illustrates an exemplary one-pass 3D image acquisition process.

In commonly assigned U.S. Pat. Nos. 7,729,049 and 7,944,609 and co-pending U.S. Published Applications 20100135573 and 20080291533 (collectively referenced herein as Zeta IP), both one-pass and two-pass 3D image acquisition processes are disclosed. Any of these processes can be applied to the system embodiments of FIGS. 2A-2D. FIG. 6 illustrates an exemplary one-pass 3D image acquisition process 600.

For example, after set-up (steps 601-605) of one-pass 3D image acquisition process 600 in system 200 (FIG. 2A), positioning means 230 can move sample 220 from a pre-determined start position away from objective lens 210 through a set of pre-determined steps. At each Z step, processor 260 turns light source 102 on and light source 101 off (hereinafter referred to as Pattern ON). As a result, an image of patterned article 104A or 104B is projected onto the focal plane of objective lens 210, and optical sensor 255 captures and saves a first image of the sample. Then processor 260 turns light source 101 on and light source 102 off (hereinafter referred to as Pattern OFF), and optical sensor 255 captures and saves a second image of the sample (step 606). This process repeats itself until all the steps have been taken (steps 607-609). When done, processor 260 analyzes the first and second image set to create a 3D image. Specifically, the image with the pattern can be used to generate a depth profile, whereas the image without the pattern can be used to generate an image intensity. Notably, this one-pass 3D image acquisition process can be further improved as described below.

First, it is unnecessary to take two images, one with Pattern ON and another with Pattern OFF, at each Z step. For example, in one embodiment, one Pattern OFF image can be captured for every few Pattern ON images without impacting the final 3D image quality. The impact is minimal because the Z information is derived from Pattern ON images only. Because the maximum number of Z steps for each 3D scan is limited by available computer memory, skipping certain number of Pattern OFF images allows the Z step limit to be increased, thereby improving the Z resolution of a 3D image.

Figure 3B:
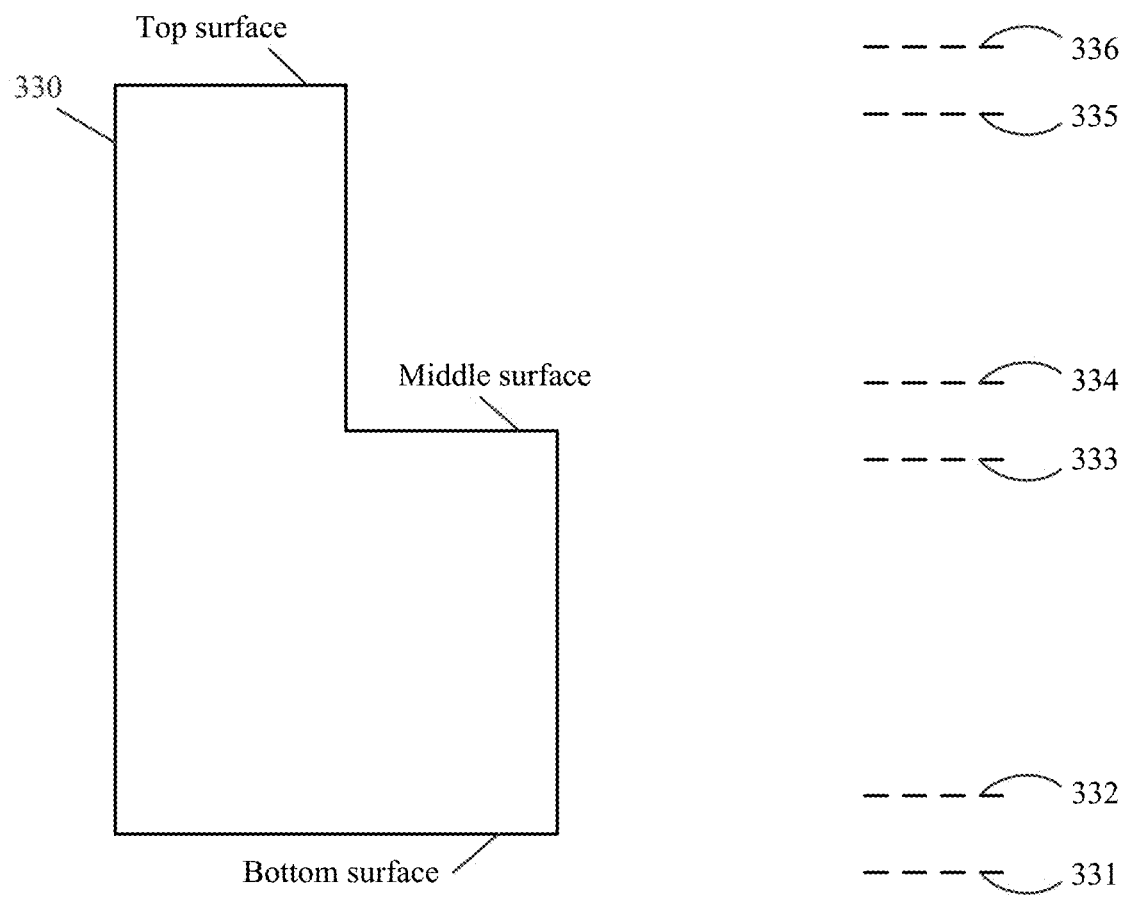
FIG. 3B illustrates exemplary surfaces of a sample and potential targeted levels of user interest.

Second, allocating available Z steps to the entire Z scan range may be unnecessary. For example, referring to FIG. 3B, if a user wants detailed texture information on the top, middle, and bottom surfaces of a sample as well as accurate measurement on top-to-middle and top-to-bottom step heights, then available Z steps can be allocated into three Z regions: between levels 331/332, 333/334, and 335/336, while skipping regions between levels 332/333 and 334/335.

Third, covering a Z scan range in equal step size may be unnecessary. Suppose a user cares much more about the middle surface than the other two surfaces in FIG. 3B. In this case, the region between levels 333 and 334 can be scanned in much finer step sizes than that for regions between levels 331/332 and 335/336.

Fourth, if positioning means 230 is a motorized Z stage with a lead screw actuator, then measurement accuracy is often affected by a phenomenon called stage drooping. Drooping occurs after the Z stage makes a large move. For example, in one embodiment, prior to a 3D scan, the Z stage is moved up to a start position and scanned downward at small steps. Because the Z stage is slowly drooping down due to gravity, the effective Z step size for a downward scan is slightly larger than the indicated step size. As a result, the measured value on a standard step height will be slightly lower than the real value for a downward scan. In another embodiment, prior to a 3D scan, the Z stage is moved down to a start position and scanned upward at small steps. Because the Z stage is slowly drooping down due to gravity, the effective Z step size for an upward scan is slightly smaller than the indicated step size. As a result, the measured value on a standard step height will be slightly higher than the real value for an upward scan. To reduce the impact of drooping on measurement accuracy, an up-down scan procedure can be used. For example, for every 3D image acquisition, an entire Z range with both a downward scan and an upward scan can be performed. The results from the up and down scans can then be averaged to yield the step height value.

The 3D image acquisition techniques described above and those described in Zeta IP can also be applied to systems 200B (FIG. 2B) and 200C (FIG. 2C). Note that Nomarski imaging provides an additional vehicle for obtaining 3D information. In general, a Nomarski system can be characterized as a shear interferometer. In this case, the Nomarski image intensity corresponds very closely to the first derivative of the optical path difference of the sample surface structure. With special data analysis algorithms, for example those described by E. B. Van Munster et. al., in "Journal of Microscopy", vol. 188, Pt. 2, November 1997, a 3D image of certain type of sample surfaces can be created from a single Nomarski image without any Z scanning. This type of imaging technique can be called a "limited" q-DIC. FIG. 4 shows a limited q-DIC image of an II-VI compound semiconductor wafer surface acquired on an implemented system 200B (FIG. 2B). In this actual surface, the measured surface roughness value Ra is 1.4 nm.

For a more general q-DIC that works on all types of sample surfaces, q-DIC system 200C (FIG. 2C) can be used. In general, the DIC image intensity can be described by the following formula (see also E. B. Van Munster et. al., in "Journal of Microscopy", vol. 188, Pt. 2, November 1997).

$$I(x, y) = I_{min(x,y)} + \frac{1}{2}[I_{max(x,y)} - I_{min(x,y)}] \times [1 + \cos(\Delta\varphi(x, y) + \delta)]$$

where $I(x,y)$ is the intensity measured at location $(x,y)$; $I_{min(x,y)}$ is the residual intensity at destructive interference; $I_{max(x,y)}$ is the intensity measured at constructive interference; $\delta$ is the additional phase shift, or bias; and $\Delta\varphi(x,y)$ is the difference between the phase at location $$\left(x - \frac{1}{2}\Delta x, y - \frac{1}{2}\Delta y\right)$$

and the phase at location $$\left(x + \frac{1}{2}\Delta x, y + \frac{1}{2}\Delta y\right),$$

where (Δx, Δy) is the lateral shear introduced by the Nomarski prism.

Based on the intensity equation above, Δφ(x,y) can be obtained by acquiring five consecutive images, each at 90° phase shift from its nearest neighbor, and using the Hariharan algorithm (see, for example, Daniel Malacara, "Optical Shop Testing", 2$^{nd}$ edition, John Wiley & Sons, Inc., 1992) to extract Δφ(x,y) as follows:

$$\Delta\varphi(x, y) = \tan^{-1}\left[\frac{2(I_2 - I_4)}{2I_2 - I_5 - I_1}\right]$$

Once Δφ(x,y) is obtained, the phase φ(x,y) or 3D surface topography can be recovered by integrating Δφ(x,y) in the shear direction.

In practice, this q-DIC technique can be used to image sample surfaces flat to within 70 nm. Rougher surfaces can be measured with the 3D image acquisition technique of Zeta IP as well as the four improvements to FIG. 6 described above. The combination of 3D scanning capability and that of q-DIC systems (FIGS. 2A, 2B, and 2C) create a powerful metrology system that can measure surface features ranging from millimeters to sub-nanometers.

The 3D image acquisition process using VSI or PSI in system 200D (FIG. 2D) is somewhat different. For VSI, only light source 101 is used, i.e. light source 102 is turned off. Filter slider 116 is positioned such that through-hole 116A is in the light path. Processor 260 commands positioning means 230 to move sample 220 to a pre-determined start position and then initiate a Z scan through a set of pre-determined steps. At each Z step, optical sensor 255 captures and saves an image of the sample interferogram. This process repeats itself until all the steps have been taken. When done, processor 260 analyzes the interferograms corresponding to each Z step using well-known peak-sensing algorithm (see, for example, James C. Wyant et. al., SPIE vol. 2782, 1996) to obtain surface height information. Because a Z move significantly smaller than the depth of focus of interference objective shifts the location of white light interference fringes, a true-color 3D image of the sample surface can be created from the VSI scan data. The 3D image construction process is as follow: for every XY pixel location, corresponding interferogram data of all the Z steps can be sorted using a peak-sensing algorithm to find $Z_{peak}$, i.e. the surface position. At this point, the color values $C_{peak}$ corresponding to this XY pixel can be extracted from an image taken at predetermined Z steps away from the $Z_{peak}$ position, knowing that interference fringes have passed the pixel at that point. The true color 3D image can then be reconstructed with data set (x, y, $Z_{peak}$, $C_{peak}$).

For PSI, only light source 101 is used, i.e. light source 102 is turned off. Filter slider 116 is then positioned such that narrow-band filter 116B is in the light path. Processor 260 commands the piezo-Z within positioning means 230 to make four phase moves (e.g. corresponding to phase shifts of 0, π/2, π, and 3π/2) while optical sensor 255 captures four interferograms. When done, processor 260 analyzes the interferograms corresponding to each Z step using the following formula (see also Daniel Malacara, *Optical Shop Testing*, 2$^{nd}$ edition, John Wiley & Sons, Inc., 1992) to obtain the wavefront phase difference φ(x, y) and the surface height information H(x,y) for every pixel (x, y).

$$\varphi(x, y) = \tan^{-1}\left\{\left[\frac{I_4(x, y) - I_2(x, y)}{I_1(x, y) - I_2(x, y)}\right]\right\}$$

and H(x,y)=λφ(x, y)/2π where $I_1(x, y)$, $I_2(x, y)$, $I_3(x, y)$, and $I_4(x, y)$ are intensity values for pixel (x, y) at each Z step.

Often times, an image acquired with a large field of view setting will have some degree of intensity non-uniformity, field curvature, and residual slope due to imperfections in the optical components of a system. There are several methods that can be employed to reduce these undesirable effects.

In the first method, the software can subtract each image being acquired with a reference image. A reference image is an image taken with the same objective, camera and coupler combination of a flat surface devoid of any detail. The resulting difference image can then have the imperfections removed.

A second method involves generating a mathematical representation of the gradual changes in image brightness from the center of the image toward the periphery. Because most intensity non-uniformity effects are radially symmetric, the mathematical model can specify brightness correction that can be applied at each radial distance from the center of the image.

Figure 5A:
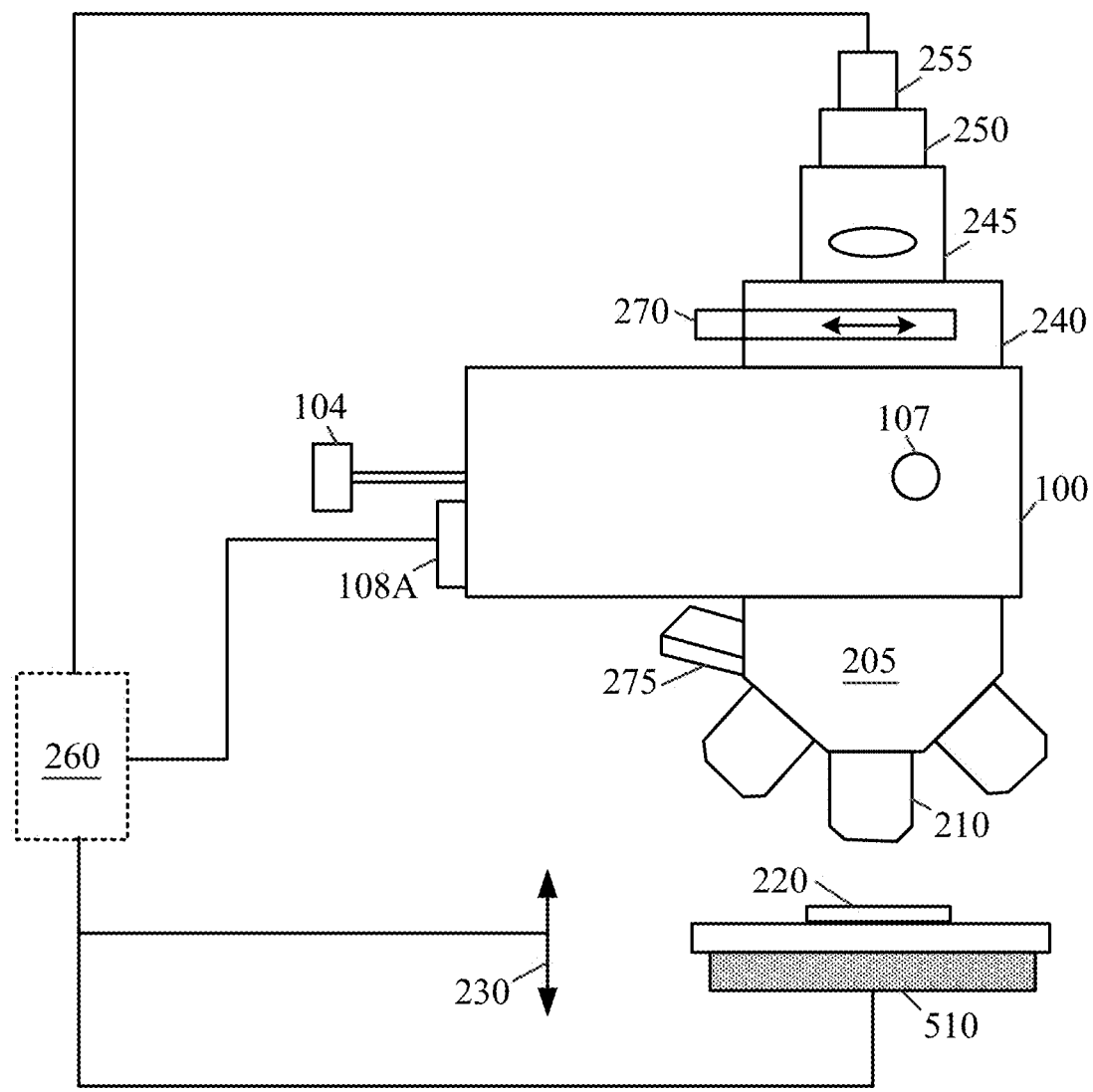
FIGS. 5A and 5B illustrate other exemplary 3D imaging and metrology systems including motorized tip and tilt stages.
Figure 5B:
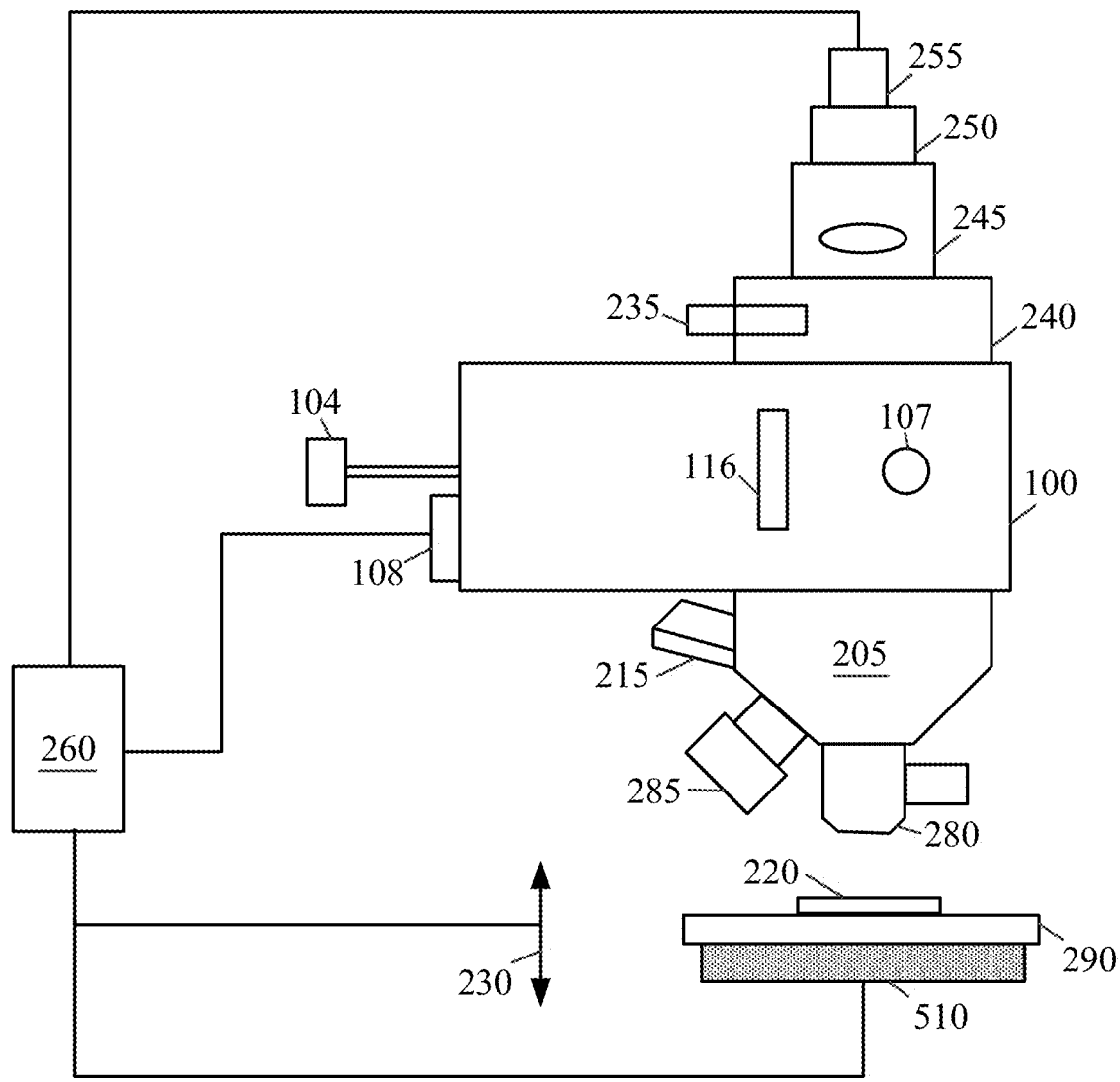

For universal slope in the image due to sample surface tilt, the built-in autocollimator can be used to level the sample surface if the amount of tilt is small and the 3D imaging method disclosed in Zeta IP if the tilt is large. This method can be applied to both interference imaging methods as well as the q-DIC imaging method. The leveling process can be automated by adding a motorized tip and tilt stage 510 to systems 200C and 200D, as shown in FIGS. 5A and 5B, respectively.

Advantageously, system 200 (FIG. 2A) can be easily transformed into system 200B (FIG. 2B) or system 200D (FIG. 2D) by positioning sliders, inserting filters, and swapping peripheral components (such as objectives and sample stages). System 200 (FIG. 2A) can also be easily transformed into system 200C (FIG. 2C) using a simple swap of illuminators. In summary, the 3D imaging and metrology system of the present invention combines capabilities of 3D scanning imaging, VSI and PSI interferometry, film thickness measurement, and Nomarski and polarized light imaging. Each of these functionalities is often addressed with separate machines in the industry. In contrast, the present invention can integrate a set of these capabilities into a compact, low cost, and robust system package, thereby resulting in a powerful 3D imaging and metrology system that can benefit a wide variety of industrial as well as R&D applications.

The embodiments described herein are not intended to be exhaustive or to limit the invention to the precise forms disclosed. As such, many modifications and variations will be apparent. Accordingly, it is intended that the scope of the invention be defined by the following Claims and their equivalents.

The invention claimed is:

1. A method of 3D imaging or measuring a sample, the method comprising:

acquiring a 3D image of a flat reference surface devoid of any features by varying a relative distance between the reference surface and an objective lens at a first plurality of predetermined steps;

at first predetermined steps:

at each of a first set of predetermined steps of the first plurality of predetermined steps:

projecting an image of a patterned article onto a focal plane of the objective lens;

capturing a first image with a pattern associated with the patterned article and the reference surface, and storing the first image in a first image array;

at each of a second set of predetermined steps of the first plurality of predetermined steps:

capturing a second image of the reference surface without the pattern associated with the patterned article, and storing the second image in a second image array;

generating a 3D image of the reference surface by analyzing the first and second images;

acquiring a 3D image of the sample by varying a relative distance between the sample and the objective lens at a second plurality of predetermined steps;

at each of a third set of predetermined steps of the second plurality of predetermined steps:

projecting an image of a patterned article onto a focal plane of the objective lens;

capturing a third image with a pattern associated with the patterned article and the sample, and storing the third image in a third image array;

at each of a fourth set of predetermined steps of the second plurality of predetermined steps:

capturing a fourth image of the sample without the pattern associated with the patterned article, and storing the fourth image in a fourth image array;

generating a 3D image of the sample by analyzing the third and fourth images; and subtracting the 3D image of the sample with the 3D image of the reference surface to yield a final 3D image and measurement results of the sample.

* * * * *